July 5, 1960
E. C. SKEI
2,943,838
SEAL FOR PLUG-TYPE VALVES
Filed June 25, 1959
2 Sheets-Sheet 1
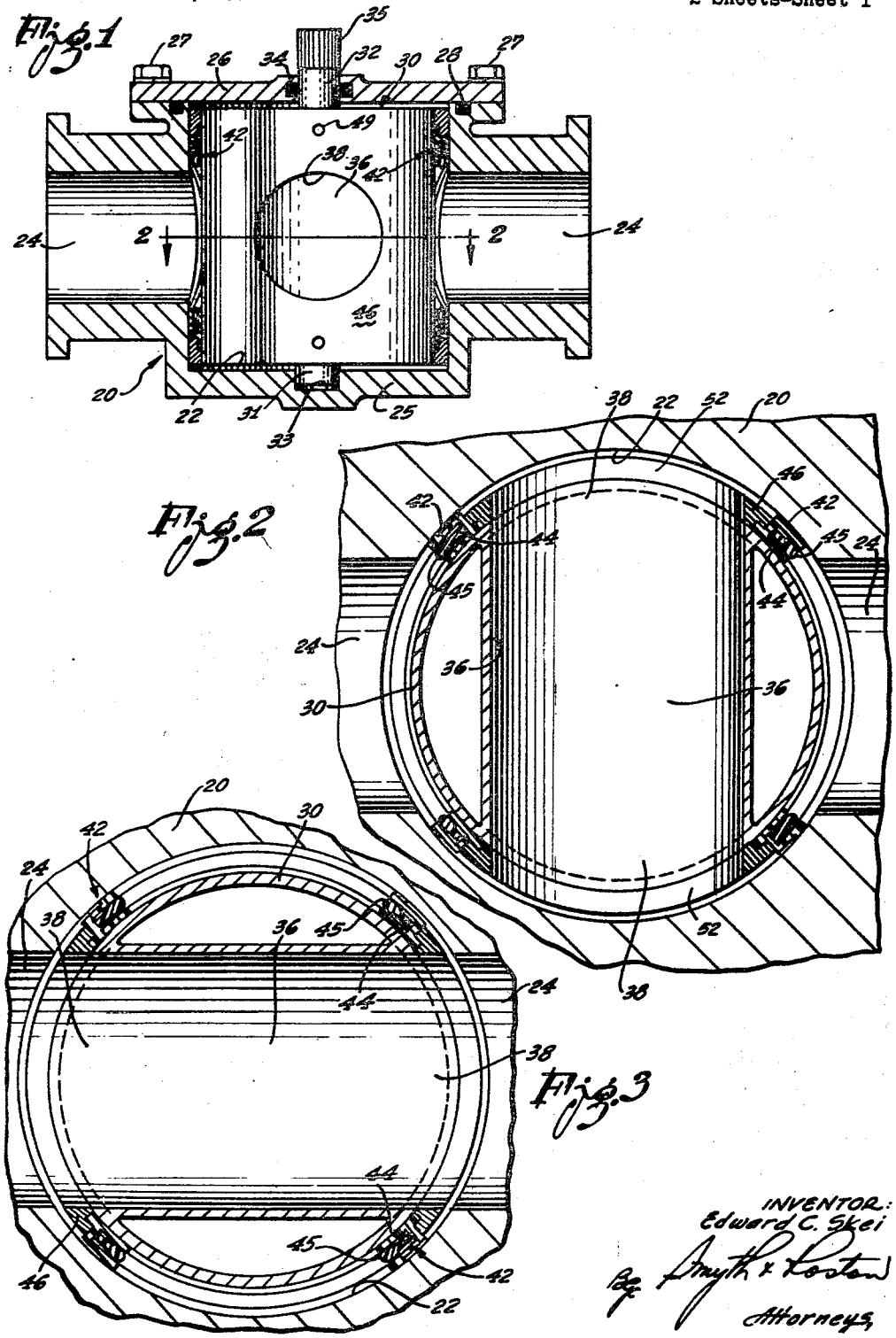
INVENTOR:
Edward C. Skei
Attorneys

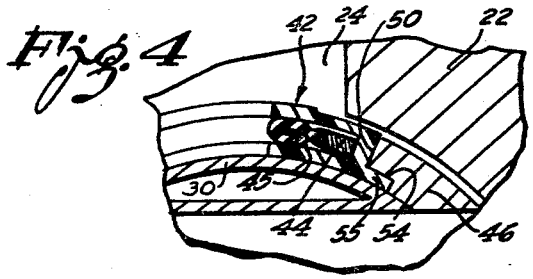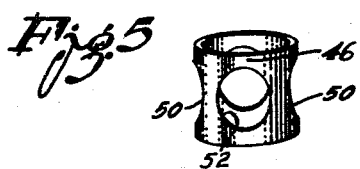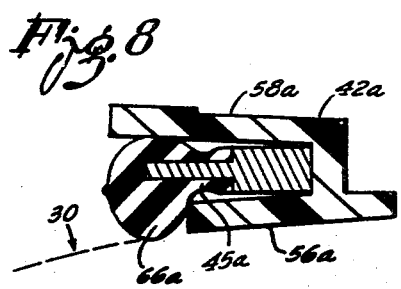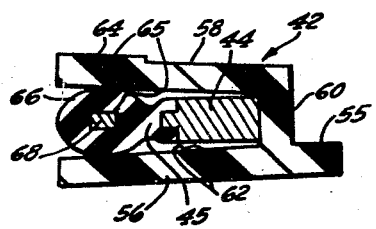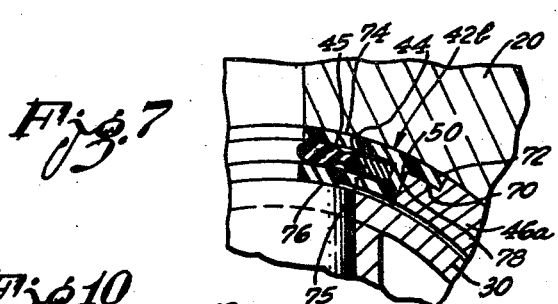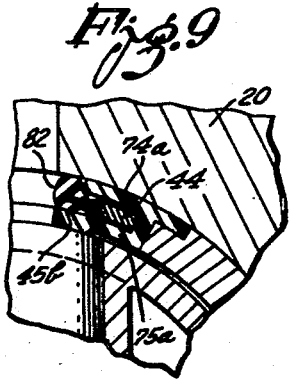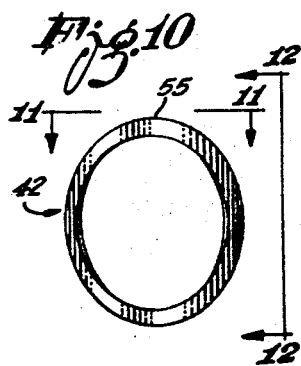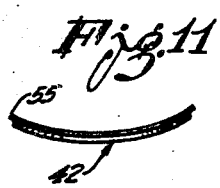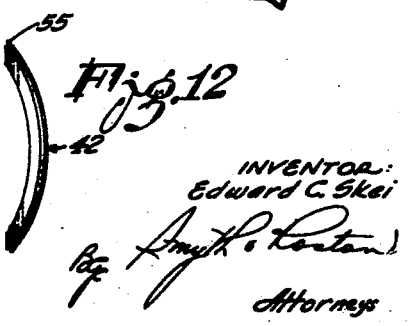

United States Patent Office 2,943,838
Patented July 5, 1960

2,943,838

SEAL FOR PLUG-TYPE VALVES

Edward C. Skei, Van Nuys, Calif., assignor to Telecomputing Corporation, Los Angeles, Calif., a corporation of California Filed June 25, 1959, Ser. No. 822,835

12 Claims. (Cl. 251—317)

This invention relates to plug-type valves and is directed specifically to improved sealing means between the rotary valve member and the surrounding valve body of such a valve.

A plug-type valve has the inherent advantages of being compact and of being operable with short actuating travel. These advantages are important for many applications and especially for aircraft use. Unfortunately, however, plug-type valves of conventional construction have serious disadvantages which have drastically curtailed their use.

The problem is to construct a plug-type valve for use under substantial fluid pressure that will meet three basic requirements. The first requirement is that the valve effectively seal off fluid in its closed position. The second requirement is that the valve offer only moderate torque resistance to operation. The third requirement is that the valve be capable of being opened and closed repeatedly with reliability over a reasonable service life without troublesome maintenance.

The difficulties involved in meeting these requirements arise from the fact that the sealing means employed in a plug-type valve is necessarily strained by heavy rubbing pressure and is necessarily subjected to disruptive forces in the operation of the valve. The rotary movement of the valve member results in progressive masking and unmasking of the sealing means, the sealing means progressively emerging from confinement under compression and progressively returning to confinement under compression with relative movement of metal edges of the valve structure across the face of the sealing means. Consequently, the actuating force for operating the valve must be adequate not only to overcome the friction of the sealing means arising from normal sealing pressure but also to overcome the resistance of the seal to progressive confinement by relative movement between metal surfaces on the opposite faces of the sealing means. In conventional constructions, these resistances result in the required operating torque being excessive to make the valve unacceptable for many important uses.

It has also been found very difficult, moreover, to provide uniformly effective sealing pressure around an annular zone that is necessarily warped in two respects to conform to the configuration of the intersection of two cylinders. One of the cylinders is the cylindrical configuration of the plug-type body and the other cylinder is the cylindrical configuration of the radial valve passage.

The severe mechanical treatment to which the annular sealing means is subjected also works against the third requirement of reliable trouble-free operation. The relatively moving metal parts tend to shear the annular sealing means and there is also a strong tendency for any rubber-like material employed in the sealing means to be extruded as the sealing means is progressively confined under compression in the opening and closing movements of the rotary valve member.

The sealing means is also subjected to disruptive forces created by the pressure and velocity of the confined fluid. The strain on the sealing means may be understood when it is considered that a high pressure differential is imposed on the sealing means radially thereof each time the valve is closed and this pressure differential disappears each time the valve is opened. In addition the annular seal is subjected to violent buffeting by turbulence created in the fluid by the opening and closing of the valve, the annular seal being largely unmasked and exposed during the transitions between the open and closed positions of the valve.

In addition to meeting the above discussed requirements, the sealing means should be conveniently replaceable. The removable structure provided for this purpose must, however, anchor the sealing means against any possible dislodgement by mechanical and fluid forces.

The invention meets these various needs by a seal comprising an assembly of parts that function together as a unit. Effective sealing contact with the relatively moving metal is provided by an annulus of the previously mentioned double-warped configuration that is made of plastic material such as Teflon (tetrafluoroethylene) or nylon (polyamide resin). Such a material has a very low coefficient of friction with respect to metal and at the same time is tough enough to stand up under severe service conditions. This reduction in friction reduces the required operating torque to a moderate magnitude.

It has been found that the requirement for maintenance of effective sealing pressure around the double-warped annulus cannot be met by any spring expedient such as a warped Belleville type spring or a warped wafer spring. The invention teaches that effective and uniform sealing pressure can be provided, however, by employing a ring of rubber-like material under axial pressure against the low friction plastic material of the annulus. Rubber-like materials employed for this purpose create a further problem, however, in that such materials commonly swell over a period of time. This further problem is met by providing ample space for radially inward expansion of the rubber-like ring.

The invention meets a number of requirements by combining a metal reinforcement ring with the plastic annulus and the pressure-creating rubber ring. The reinforcement ring is backed edgewise into an annular groove or slot in the low friction plastic annulus and is effectively bonded to the outer circumference of the pressure-creating rubber ring.

The metal reinforcement ring is of the required double-warped configuration to conform to the intersection of two perpendicular cylinders and serves as means to give the whole seal assembly the same configuration. Thus the plastic annulus may be molded to simple circular configuration in an economical manner instead of being molded to the special double-warped configuration. The reinforcement ring not only shapes the plastic annulus in which it is mounted but also reinforces the annulus. In the preferred practice of the invention, the plastic annulus is provided with a radial circumferential flange for anchorage and it is especially advantageous that the metal reinforcement ring lies close to this flange and thus reinforces the flange. In addition, the reinforcement ring by reason of its attachment to the rubber-like ring effectively anchors the rubber-like ring against dislodgement or extrusion.

The features and advantages of the invention may be understood from the following detailed description considered with the accompanying drawings.

In the drawings, which are to be regarded as merely illustrative:

Fig. 1 is a sectional view of a plug-type valve in closed position embodying a selected embodiment of the sealing means, the sealing means being fixedly mounted on the rotary valve member in frictional contact with the surrounding valve body;

Fig. 2 is an enlarged cross section along the line 2—2 of Fig. 1;

Fig. 3 is a sectional view similar to Fig. 2 showing the rotary valve member turned to its open position;

Fig. 4 is a fragmentary sectional view of the same valve at a partially open position;

Fig. 5 is a reduced scale perspective view of a sleeve that retains the sealing means on the rotary valve member;

Fig. 6 is a greatly enlarged radial section of the sealing means;

Fig. 7 is a fragmentary radial sectional view of a sealing means of the character of the first form shown in Figs. 1–5, the sealing means being fixedly mounted on the valve body instead of being mounted on the rotary valve member and, accordingly, being of reversed configuration;

Fig. 8 is a sectional view similar to Fig. 6 showing a second form of sealing means;

Fig. 9 is a view similar to Fig. 8 showing a sealing means of the character of the second form shown in Fig. 7, the sealing means being reversed in configuration and being fixedly mounted on the valve body instead of being mounted on the rotary valve member;

Fig. 10 is a face view of the first form of the sealing means;

Fig. 11 is an edgewise view of the same sealing means as seen along the line 11—11 of Fig. 10. This view shows how the annular sealing means is warped in one respect to conform to the configuration of the intersection of two perpendicular cylinders;

Fig. 12 is an edgewise view of the same sealing means as seen along the line 12—12 of Fig. 10. This view shows how the sealing means is warped in a second respect to conform to the configuration of intersecting perpendicular cylinders.

Figs. 1 to 3, illustrating a selected embodiment of the invention, shows a valve body, generally designated 20, forming a cylindrical cavity 22 with two diametrically opposite peripheral ports 24. The cylindrical cavity 22 is closed by an end wall 25 at one end and at the other end is closed by a cover plate 26 that is secured by cap screws 27 and sealed by an O-ring 28.

A hollow walled cylindrical valve member 30 is rotatably mounted in the valve body cavity 22 and for this purpose is formed with a pair of trunnions 31 and 32. The trunnion 31 is journaled in a circular recess 33 in the end wall 25 and the second trunnion 32 is journaled in the cover plate 26 and is sealed by a suitable O-ring 34. The outer end of the trunnion 32 is splined as indicated at 35 for operative connection to a handle or suitable actuating means. The cylindrical valve member 30 is provided with a diametrical passage 36 which forms two peripheral ports 38 for rotation into and out of register with the peripheral ports 24 of the valve body 20.

In accord with the teachings of the invention, a sealing means for each of the peripheral ports 24 of the valve body 20 at the closed position of the valve member 30 may be in the form of a sealing assembly that is best shown in Figs. 4 and 6. This sealing assembly comprises an annulus of Teflon or the like, generally designated 42, a relatively stiff reinforcement ring 44 and a pressure-creating rubber-like ring 45. The two sealing assemblies are mounted on blind sides of the cylindrical valve member 30 on a diametrical axis that is 90° from the axis of the diametrical passage 36.

At the closed position of the valve member 30 shown in Fig. 2 where the peripheral ports 38 of the valve member are rotated 90° out of register with the peripheral ports 24 of the valve body, the two sealing assemblies surround the peripheral ports 24 of the valve body to seal the juncture between the valve body and the rotary valve member, thereby to cut off flow through the valve. On the other hand, at the open position of the valve shown in Fig. 3 with the peripheral ports 38 of the valve member registered with the peripheral ports 24 of the valve body, there is free fluid communication through the valve with the two sealing assemblies rotated to ineffective positions away from the fluid stream.

The two sealing assemblies are of appreciable thickness and may be seated in annular recesses of corresponding depth in the periphery of the cylindrical valve member 30. In the preferred practice of the invention, however, the two sealing assemblies are mounted on the periphery of the rotary valve member 30 by means of a cylindrical retainer sleeve 46 that is best shown in Fig. 5 and which may be considered as a part of the cylindrical valve member. The sleeve 46 snugly embraces the rotary valve member 30 and may be provided with small apertures 48 to receive dowels or pins 49 (Fig. 1) for anchoring the sleeve against movement relative to the rotary valve body.

As shown in Fig. 5, the retainer sleeve 46 has a pair of diametrically opposite openings 50 to mount the two sealing assemblies respectively against the blank sides of the rotary valve member 30 and the retainer sleeve has a second pair of diametrically opposite openings 52 90° from the openings 50 to register with the two peripheral ports 38 of the valve member and to be considered as parts of the structure forming these ports. As best shown in Fig. 4, each of the diametrically opposite openings 50 of the retainer sleeve 46 may be undercut on its inner side to form an annular groove 54 for anchorage of the corresponding sealing assembly.

The plastic annulus 42 has an outer circumferential flange 55 as best shown in Fig. 6 to seat in the annular groove 54. It is apparent that each of the sealing assemblies may be mounted in the retainer sleeve 46 from inside the sleeve to seat the flanges 55 in the annular grooves 54 and then the retainer sleeve may be telescoped onto the rotary valve member 30 for positive anchorage of the two sealing assemblies.

The plastic annulus 42 of a sealing assembly has what may be termed a first side wall 56 in contact with the rotary valve member 30 on which it is mounted and has what may be termed a second side wall 58 for frictional and sealing contact with the valve body 20. These two side walls 56 and 58 of the plastic annulus are spaced apart axially and are interconnected in an outer radial zone by a circumferential web 60, thus forming a radially inwardly opening annular slot 62. In this particular practice of the invention, the second side wall 58 which makes sealing and frictional contact with the valve body 20 is cut away to form a relatively narrow annular land 64 to achieve high unit sealing pressure.

The reinforcement ring 44 is seated in the annular slot 62 and may be backed snugly against the circumferential web 60. The reinforcement ring 44 may be made of any strong and relatively rigid material and preferably is made of a suitable metal.

The rubber-like ring 45 may be made of any suitable elastomer that will resiliently resist deformation when subjected to compression. The rubber-like ring 45 extends radially inwardly from the reinforcement ring 44 and is effectively bonded thereto. In this instance, the reinforcement ring 44 is formed with a circumferential series of apertures 65 near its inner edge and the rubber-like ring 45 is molded and bonded to the reinforcement ring in a well-known manner with the material of the rubber-like ring filling the apertures 65 for positive interlocking of the two rings.

The rubber-like ring 45 is of bulbous configuration in radial section, being formed with an annular enlargement 66 between the two side walls 56 and 58. This enlargement tends to spread the two side walls apart and thereby exerts outward pressure against the side wall 58 when the sealing assembly is confined between the rotary valve member 30 and the inner circumferential wall of the valve body cavity 22. As may be seen in Fig. 6, the annular enlargement 66 is in the radial region of the annular land 64.

The reinforcement ring serves a number of purposes. Since the reinforcement ring 44 is backed into the slot 62 of the plastic annulus 42 close to the region of the flange 55, it effectively reinforces the plastic annulus in the region of the flange and thus increases the effectiveness of the flange for anchoring the sealing assembly in place to resist the various forces that tend to dislodge the sealing assembly. It may also be seen in Fig. 6 that an inner rim portion 68 of the reinforcement ring 44 serves as a core for the annular enlargement 66 and thus causes relatively steep rise in sealing pressure in response to axial compression of the rubber-like ring.

Another function of the reinforcement ring 44 is to form the sealing assembly to the configuration shown in Figs. 10, 11 and 12. This configuration conforms to the intersection of two cylinders, one cylinder being defined by the valve body cavity 22 or by the periphery of the rotary valve member 30, the second cylinder being defined by the peripheral ports 24 of the valve body or the peripheral ports 38 of the rotary valve member. This configuration of the sealing assembly to which it is formed by the relatively rigid reinforcement ring 44 may be aptly termed a double-bowed configuration as may be understood by reference to Figs. 11 and 12. Fig. 11 shows the bowed profile of a sealing assembly as viewed in a direction parallel with the axis of rotation of the rotary valve member 30 and Fig. 12 shows how the sealing assembly is bowed as viewed edgewise in a direction perpendicular to the axis of rotation.

Another function of the reinforcement ring 44 is, of course, to anchor the rubber-like pressure-creating ring 66 in the annular slot 62 of the annulus 42. The reinforcement ring effectively resists the tendency of the rubber-like ring to be dislodged and effectively resists the tendency of the rubber-like material to be extruded from the annular slot 62 by the mechanical forces involved in the opening and closing movements of the valve.

It may be readily appreciated that repeated rotation of the two sealing assemblies relative to the peripheral ports 24 of the valve body 20 results in repeated cycles of compression and release of the material of the sealing assemblies and repeated cycles of an action that tends to shear the sealing assemblies. In Fig. 4, for example, it is apparent that the portion of the sealing assembly that lies within the area of the valve port 24 is free from axial compression and that shift of the sealing assembly relative to the port 24 as the valve member 30 subjects the annular area of the sealing assembly progressively to axial compression with a mechanical shearing tendency.

Fig. 8 shows a sealing assembly that may be substituted for the sealing assembly in the valve construction shown in Figs. 1 and 2. This sealing assembly is largely identical with the previously described sealing assembly as indicated by the use of corresponding numerals to indicate corresponding parts. In this instance, the first side wall 56a of the plastic annulus 42 is substantially shorter in inward radial extent than the second side wall 50a to permit the rubber-like ring 45a to make direct sealing contact with the adjacent peripheral surface of the rotary valve member 30. The enlargement 66a of the rubber-like ring 45a is correspondingly greatly increased in axial dimension to make the sealing contact with the rotary valve body and to provide the required axial pressure against the second side wall 58a of the annulus 42a as required for effective sealing pressure of the side wall against the surrounding valve body 20.

Fig. 7 shows how the valve structure shown in Figs. 1, 2 and 3 may be reversed for mounting of two sealing assemblies in fixed positions on the valve body 20 instead of being mounted on the valve member 30 for rotation therewith. In the modification shown in Fig. 7, the valve body 20 and the rotary valve member 30 are unchanged. The retainer sleeve 46a, however, is fixedly secured to the valve body 20 to serve as a liner for the valve body cavity 22 and the retainer sleeve is cut away around each of the openings 50 to form an annular groove 70 to seat a correspondnig outer flange 72 of the sealing assembly.

The sealing assembly is a reversal of the previously described sealing assembly in that it is its outer side wall 74 that makes stationary contact with adjacent metal, the inner side wall 75 making frictional and sealing contact with the adjacent metal. The inner side wall 75 is cut away to form an annular sealing land 76 and the two side walls are interconnected by the usual circumferential web 78 to form the usual annular slot. The previously mentioned reinforcement ring 44 with the previously mentioned rubber-like ring 45 bonded thereto is seated in the annulus 42b in the previously described manner to perform the previously described functions.

Fig. 9 shows how a modified sealing assembly may be substituted for the sealing assembly in Fig. 7. The sealing assembly shown in Fig. 9 corresponds to the modification shown in Fig. 8.

In Fig. 9, the first or outer side wall 74a is of shorter inner radial extent than the second inner side wall 75a to permit the rubber-like ring 45b to make direct stationary contact with the surrounding valve body 20. For this purpose, the rubber-like ring 80 which is anchored in the usual manner to a reinforcement ring 44 is formed with a bulbous enlargement 82 of increased axial dimension for the purpose of making the contact with the surrounding valve body 20 and the further purpose of exerting effective pressure against the second inner side wall 75a of the annulus.

My description in specific detail of the selected embodiment of the invention will suggest various changes, substitutions and other departures from my disclosure within the spirit and scope of the appended claims. For example, the cavity in the valve body and the rotary valve member therein may be tapering or conical instead of cylindrical.

I claim:

1. In a valve of the type wherein an outer body member forms a cavity of circular cross section with at least one peripheral port and a valve member of circular cross section having at least one peripheral port is mounted in said cavity for rotation to move its peripheral port into and out of register with the peripheral port of the outer body member, sealing means effective between said two members comprising: an annulus of flexible plastic material mounted on one of said two members for sealing contact with the other of said two members, said plastic material having a low coefficient of friction with respect to metal, said annulus having two spaced opposite circumferential side walls for contact with said two members respectively, said two side walls being interconnected in a radially outward circumferential region to form a radially inwardly opening annular slot; a stiff reinforcement ring bowed in two respects to conform to the periphery of said valve member around the peripheral port in the valve member, said reinforcement ring being seated edgewise in said slot to hold said annulus to the same double-bowed configuration; and a resiliently deformable ring of rubber-like material bonded to said reinforcement ring and extending radially inward therefrom in contact with the circumferential side wall of the annulus that contacts said other of said two members, said rubber-like ring being axially dimensioned for axial compression by confinement of the sealing means between said two members whereby the rubber-like ring presses said last-mentioned side wall of the annulus into sealing contact with said other of the two members.

2. Sealing means as set forth in claim 1 which includes a sleeve in said cavity attached to said one of the two members, said sleeve surrounding and engaging said annulus to anchor the annulus to said one of the two members.

3. Sealing means as set forth in claim 1 in which said annulus has a peripheral flange for anchorage of the annulus to said one of said two members.

4. Sealing means as set forth in claim 1 in which the side wall of the annulus that contacts said other of said two members has a circumferential land narrower than the side wall for contact with said other of said two members with relatively high unit pressure.

5. Sealing means as set forth in claim 1 in which said rubber-like ring is sandwiched between said two side walls of the annulus out of contact with both of said two members, the rubber-like ring pressing the two side walls into sealing contact with the two members respectively.

6. Sealing means as set forth in claim 1 in which the inner radial portion of said rubber-like ring is of bulbous cross-sectional configuration.

7. Sealing means as set forth in claim 1 in which said reinforcement ring has a series of circumferentially spaced apertures; and in which the material of the rubber-like ring extends through said apertures.

8. In a valve of the type wherein an outer body member forms a cavity of circular cross section with at least one peripheral port and a valve member of circular cross section having at least one peripheral port is mounted in said cavity for rotation to move its peripheral port into and out of register with the peripheral port of the outer body member, sealing means effective between said two members comprising: an annulus of flexible plastic material mounted on one of said two members for sealing contact with the other of said two members, said plastic material having a low coefficient of friction with respect to metal, said annulus having a first circumferential side wall in contact with said one of the two members and having a second opposite side wall in contact with said other of the two members, said first side wall being of lesser radially inward extent than said second side wall, said two side walls being interconnected in a radially outward circumferential region to form a radially inwardly opening annular slot; a stiff reinforcement ring bowed in two respects to conform to the general configuration of the periphery of said valve member around its peripheral port, said reinforcement ring being seated edgewise in said slot to hold said annulus to the same double-bowed configuration; and a resiliently deformable ring of rubber-like material bonded to said reinforcement ring and extending radially inwardly therefrom in axial compression between said one of the two members and said second side wall of the annulus for sealing contact with said one of the two members and to press said second side wall of the annulus into effective sealing contact with said other of the two members.

9. Sealing means as set forth in claim 8 in which said second side wall is formed with a relatively narrow circumferential land for sealing contact of said other of the two members, said land being in the radial region of the portion of the second side wall that is under axial pressure from said rubber-like ring.

10. Sealing means as set forth in claim 8 in which the inner radial portion of said rubber-like ring that is under axial compression is of bulbous cross-sectional configuration.

11. Sealing means as set forth in claim 8 in which said reinforcement ring has a series of circumferentially spaced apertures; and in which the material of the rubber-like ring extends through said apertures.

12. In a valve of the type wherein an outer body member forms a cavity of circular cross section with at least one peripheral port and a valve member of circular cross section having at least one peripheral port is mounted in said cavity for rotation to move its peripheral port into and out of register with the peripheral port of the outer body member, sealing means effective between said two members comprising: an annulus of flexible plastic material mounted on one of said two members for sealing contact with the other of said two members, said plastic material having a low coefficient of friction with respect to metal, said annulus having two spaced opposite circumferential side walls for contact with said two members respectively, said two side walls being interconnected in a radially outward circumferential region to form a radially inwardly opening annular slot, said annulus being formed with a radially outwardly extending circumferential flange; retaining means releasably attached to said one of the two members and surrounding said annulus in engagement with said flange to anchor the annulus to said one of the two members; a stiff reinforcement ring bowed in two respects to conform to the general configuration of the periphery of said valve member around its peripheral port, said reinforcement ring being seated edgewise in said slot to hold said annulus to the same double-bowed configuration; and a resiliently deformable ring of rubber-like material bonded to said reinforcement ring and extending radially inward therefrom in contact with the circumferential side wall of the annulus that contacts said other of the two members, said rubber-like ring being axially dimensioned for axial compression by confinement of the sealing means between said two members whereby the rubber-like ring presses said last-mentioned side wall of the annulus into sealing contact with said other of the two members.

References Cited in the file of this patent
UNITED STATES PATENTS

| | | |
|---|---|---|
| 2,482,873 | Roberts | Sept. 27, 1949 |
| 2,844,353 | Gurries | July 22, 1958 |
| 2,852,226 | Wheatley | Sept. 16, 1958 |

FOREIGN PATENTS

| | | |
|---|---|---|
| 489,834 | France | Nov. 5, 1918 |